(12) United States Patent
McCullough et al.

(10) Patent No.: US 8,330,625 B2
(45) Date of Patent: Dec. 11, 2012

(54) AIRCRAFT SYSTEMS WITH FLIGHT MANAGEMENT SYSTEMS THAT DISPLAY REPORTS

(75) Inventors: Susan L. McCullough, Glendale, AZ (US); Dave Bibby, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1551 days.

(21) Appl. No.: 11/694,678

(22) Filed: Mar. 30, 2007

(65) Prior Publication Data

US 2010/0026523 A1 Feb. 4, 2010

(51) Int. Cl.
*G01C 21/00* (2006.01)
(52) U.S. Cl. ......... 340/971; 340/973; 340/979; 340/980
(58) Field of Classification Search .................. 340/971
See application file for complete search history.

(56) References Cited

U.S. PATENT DOCUMENTS

| | | | |
|---|---|---|---|
| 4,604,711 A * | 8/1986 | Benn et al. | 701/14 |
| 4,642,775 A * | 2/1987 | Cline et al. | 701/200 |
| 5,475,594 A * | 12/1995 | Oder et al. | 701/14 |
| 5,522,026 A | 5/1996 | Records et al. | |
| 6,052,115 A | 4/2000 | Gregg et al. | |
| 6,278,913 B1 | 8/2001 | Jiang | |
| 6,310,634 B1 | 10/2001 | Bodnar et al. | |
| 6,313,759 B1 | 11/2001 | Musland-Sipper | |
| 6,356,859 B1 * | 3/2002 | Talbot et al. | 702/188 |
| 6,542,796 B1 | 4/2003 | Gibbs et al. | |
| 6,721,640 B2 | 4/2004 | Glenn et al. | |
| 6,727,912 B1 | 4/2004 | Wyatt | |
| 6,868,320 B1 | 3/2005 | Burch | |
| 7,030,892 B1 | 4/2006 | Gyde et al. | |
| 7,072,746 B1 | 7/2006 | Burch | |
| 7,633,428 B1 * | 12/2009 | McCusker et al. | 342/26 B |
| 2002/0004695 A1 | 1/2002 | Glenn et al. | |
| 2002/0120372 A1 | 8/2002 | Lafon et al. | |
| 2003/0038726 A1 * | 2/2003 | Yoshida et al. | 340/691.1 |
| 2004/0158364 A1 | 8/2004 | Lafon et al. | |
| 2005/0007386 A1 * | 1/2005 | Berson et al. | 345/633 |
| 2005/0162434 A1 * | 7/2005 | Hancock et al. | 345/501 |
| 2008/0211814 A1 * | 9/2008 | Capircio et al. | 345/441 |

* cited by examiner

*Primary Examiner* — George Bugg
*Assistant Examiner* — Ojiako Nwugo
(74) *Attorney, Agent, or Firm* — Ingrassia Fisher & Lorenz, P.C.

(57) ABSTRACT

An aircraft system includes a visual display system; a printer; and a flight management system coupled to the visual display system and the printer. The flight management system includes a processor and a plurality of data sources coupled to the processor. The processor includes a crew interface module coupled to the plurality of data sources, a display driver coupled to the crew interface module and the visual display system, and a printer driver coupled to the crew interface module and the printer. The crew interface module is configured to generate a report from data from the data sources and to send the report to the visual display system via the display driver. The visual display system is configured to receive the report and to display the report.

20 Claims, 4 Drawing Sheets

AIRCRAFT SYSTEMS WITH FLIGHT MANAGEMENT SYSTEMS THAT DISPLAY REPORTS

FIELD OF THE INVENTION

The present invention generally relates to aircraft systems with flight management systems, and more particularly relates to aircraft systems with flight management systems that display reports.

BACKGROUND OF THE INVENTION

Flight management systems are used on aircraft to integrate information from data sources and to perform, or assist a pilot in performing, functions related to, for example, navigation, flight planning, guidance and navigation, and performance management. Many aircraft have a visual display system coupled to the flight management system that displays a number of different screen pages in which the user can obtain information or perform a function. For example, the flight management system can display a flight plan on the visual display system.

In addition, a printer may be coupled to the flight management system to print the flight plan. However, conventional flight management systems may present problems in that the flight plan cannot be viewed in the format and/or scale that the flight plan is to be printed. This may result in wasted time, and paper, printing undesired information and/or formats of the flight plan and reprinting the desired information and/or formats.

Conventional flight management systems are also problematic in that, generally, a user must scroll through a plurality of screen pages to obtain a flight plan or other types of desired information. This can be problematic due to the fact that certain pages are available only after viewing a hierarchy of other pages and/or the desired information may be on more than one page. This process of viewing desired information is time consuming and inefficient.

Accordingly, it is desirable to provide aircraft systems with flight management systems that enable users to view desired information before printing. In addition, it is desirable to aircraft systems with flight management systems that enable a user to view desired information on one screen that would otherwise only be viewable on a plurality of screens. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An aircraft system is provided in accordance with an exemplary embodiment of the present invention. The aircraft system includes a visual display system; a printer; and a flight management system coupled to the visual display system and the printer. The flight management system includes a processor and a plurality of data sources coupled to the processor. The processor includes a crew interface module coupled to the plurality of data sources, a display driver coupled to the crew interface module and the visual display system, and a printer driver coupled to the crew interface module and the printer. The crew interface module is configured to generate a report from data from the data sources and to send the report to the visual display system via the display driver. The visual display system is configured to receive the report and to display the report.

A method for providing a report to a user in an aircraft in accordance with an exemplary embodiment of the present invention is provided. The method includes selecting a report key on a visual display system; collecting information in a crew interface module from a plurality of data sources; formatting the information into a report represented by device-independent graphics commands; providing the device-independent graphics commands representing the report to a display driver; and displaying the report on a display of the visual display system.

An aircraft system in accordance with an exemplary embodiment of the present invention is provided. The aircraft system includes a visual display system; a printer; and a flight management system coupled to the visual display system and the printer. The flight management system includes a processor and a plurality of data sources coupled to the processor. The processor includes a crew interface module coupled to the plurality of data sources, a display driver coupled to the crew interface module and the visual display system, and a printer driver coupled to the crew interface module and the printer. The crew interface module is configured to generate a report from data from the data sources, and send the report to the visual display system via the display driver and to the printer via the printer driver. The crew interface module includes a format module for formatting the data from the data sources into the report. The format module includes a scrolling graphical component configured to convert a first portion of the data of the report into a scrollable list for display on the visual display system.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
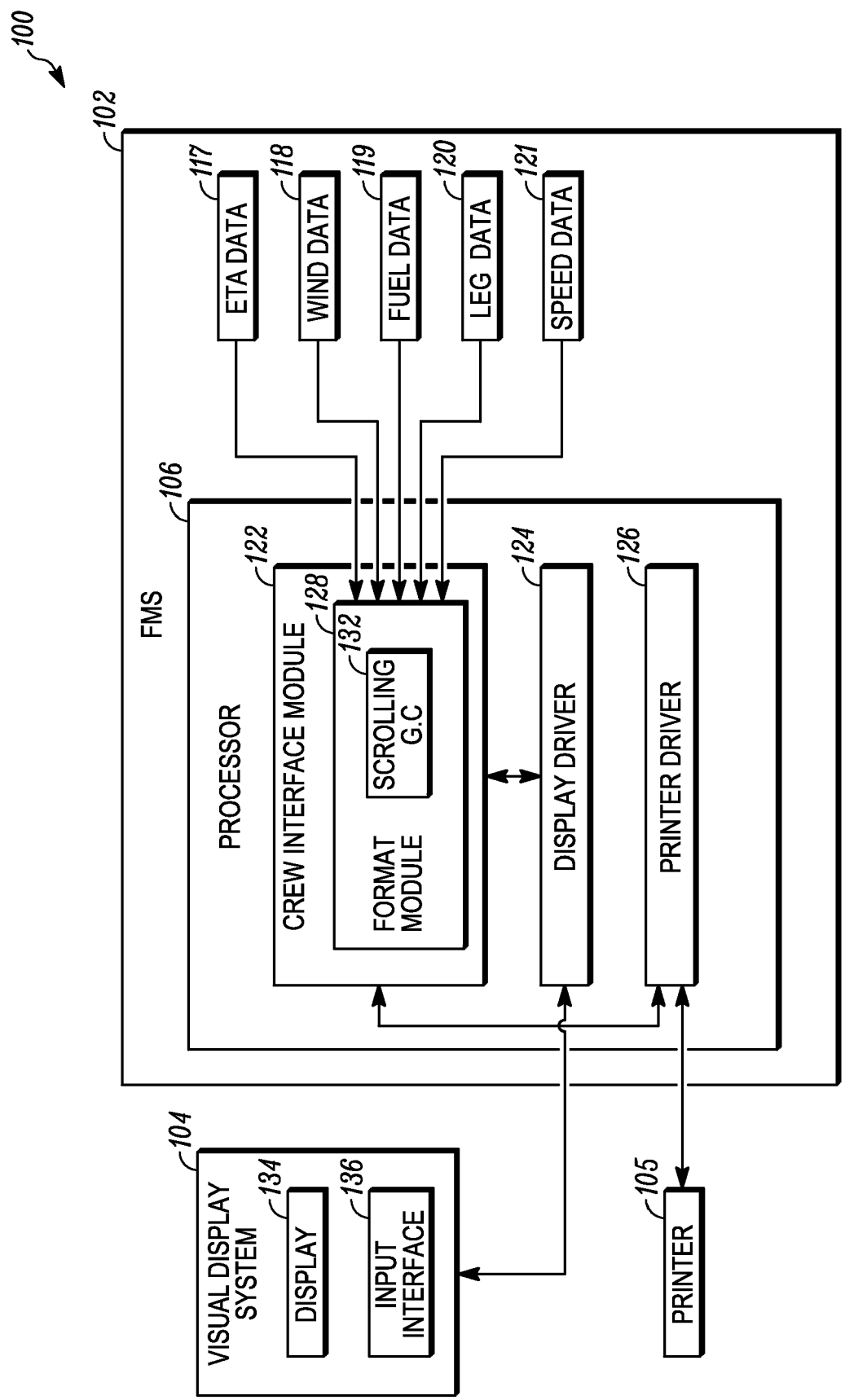
FIG. 1 is a schematic representation of an aircraft system in accordance with an exemplary embodiment of the present invention.

Referring to FIG. 1, an aircraft system 100 in accordance with one embodiment of the present invention includes a visual display system 104, printer 105, and a flight management system 102. The visual display system 104 and printer 105 are each coupled to the flight management system 102. It can be appreciated that the aircraft system 100 includes other components not illustrated or discussed herein for brevity in describing exemplary embodiments of the present invention.

The flight management system 102 includes a processor 106 and data sources 117-121 coupled to the processor 106.

The processor 106 of the flight management system 102 integrates information from the data sources 117-121 shown in FIG. 1, as well as additional data sources, such as input from the pilot or other users.

The flight management system 102 utilizes the information from the data sources to perform or assist in functions such as navigation, flight planning, performance management, guidance and control, datalink communications, and data processing display and printing. Although not specifically depicted, it can be appreciated that the flight management system 102 can include other devices and components in addition to the illustrated processor 106 and data sources 117-121, such as, for example, RAM, ROM, additional storage devices, communications interfaces, systems buses, and input devices, such as a keyboards and a mouse.

The processor 106 is generally configured for executing data processing and device control by performing operations and making decisions in accordance with instructions. The processor 106 may include any number of individual microprocessors, memories, storage devices, interface cards, and other conventional components known in the art. In one embodiment, the processor 106 processes instructions for one or more components, such as, for example, a crew interface module 122, a display driver 124, and a printer driver 126. The display driver 124 and the printer driver 126 are respectively coupled to the visual display system 104 and the printer 105, and each will be described in greater detail below.

The data sources 117-121 accessible to the processor 106 can store aeronautical information related to the state of the aircraft. In the illustrated embodiment, data sources related to ETA data 117, wind data 118, fuel data 119, leg data 120, and speed data 121 are provided as examples. Of course, other types of data sources can also be provided, such as data sources related to, for example, flight plan data, data related to airways, navigational aids, navigational data, obstructions, taxi registration, remaining fuel, Special Use Airspace, political boundaries, COM frequencies (en route and airports), approach information, geographical information, inertial references, navigation radio and the like.

As noted above, the flight management system 102 is coupled to the visual display system 104 and the printer 105. In one embodiment, the visual display system 104 can be an emulated control display unit (CDU) or a graphical multi-functional display (MFD). In another embodiment, the visual display system 104 is an ARINC 661 display system, an OpenGL graphics system, or other type of graphical/textual display system. The visual display system 104 includes a display 134 and an input interface 136. The display 134 may include one or more display monitors suitable for displaying various symbols and information. The display 134 can include, for example, a cathode ray tube (CRT), a liquid crystal display (LCD), a Heads Up Display (HUD), and a Helmet Monitored Display (HMD). The display 134 is preferably interactive, and as such, includes a touch-screen and/or another mechanism for function, display, and/or cursor control. The input interface 136 can be any device suitable for providing user instructions to the visual display system 104. The input interface 136 can be a virtual, multifunction user interface, and is discussed in further detail with reference to FIG. 2. The printer 105 can be any device that provides a hard copy of a file or document stored in or provided to the flight management system 102. The printer 105 can be postscript or text-based, and can be, for example, a toner-based, inkjet, and/or solid ink printer.

Figure 2:
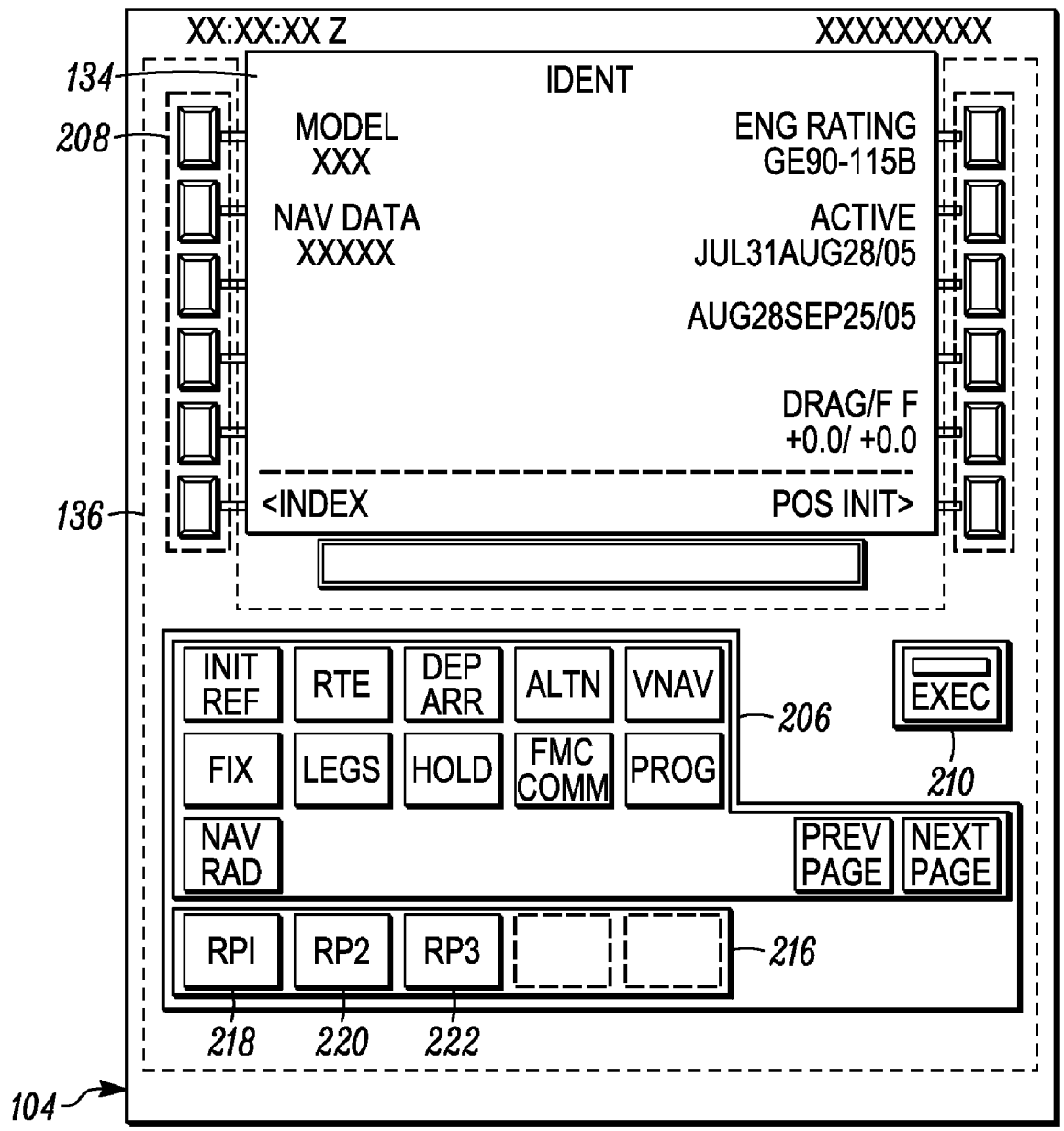
FIG. 2 is a schematic representation of the visual display system suitable for use in the aircraft system of FIG. 1.

FIG. 2 is a more detailed schematic representation of the visual display system 104 of the aircraft system 100 of FIG. 1. It can be appreciated that FIG. 2 illustrates just one exemplary visual display system 104. In other embodiments, aspects such as the appearance of the visual display system 104 can be different. Generally, the display 134 and input interface 136 of the visual display system 104 display and allow manipulation of information relating to navigation and control of the aircraft. The display 134 is depicted in FIG. 2 as displaying a current screen page. The current screen page displayed in the display 134 of FIG. 2 is an IDENT page, which includes the aircraft configuration and the loaded navigation information from one or more of the data sources 117-121. The input interface 136 of the visual display system 104 referenced in FIG. 1 corresponds to a set of mode keys 206, a set of line select keys 208, an execute key 210, and a plurality of report keys 216, which are discussed in further detail below. In this embodiment, the mode keys 206 are graphical, virtual softkeys drawn as buttons on the input interface 136. However, the mode keys 206 can also be represented by any alternative user interface component, such as, for example, a drop down list. The current screen page in the display 134 can be changed or manipulated by pressing one or more of the mode keys 206. In other words, the mode keys 206 can be associated with a screen page that can be displayed in the display 134 of the visual display system 104.

The line select keys 208 along the side of the display 134 enable the user to perform functions associated with the navigation and control of the aircraft specific to the screen page displayed in the display 134. The line select keys 208 additionally enable the user to navigate the screens, enter flight plan data, performance data, and navigation data, as well as initiating functions such as printing the flight plan and aligning the inertial reference system.

Figure 3:
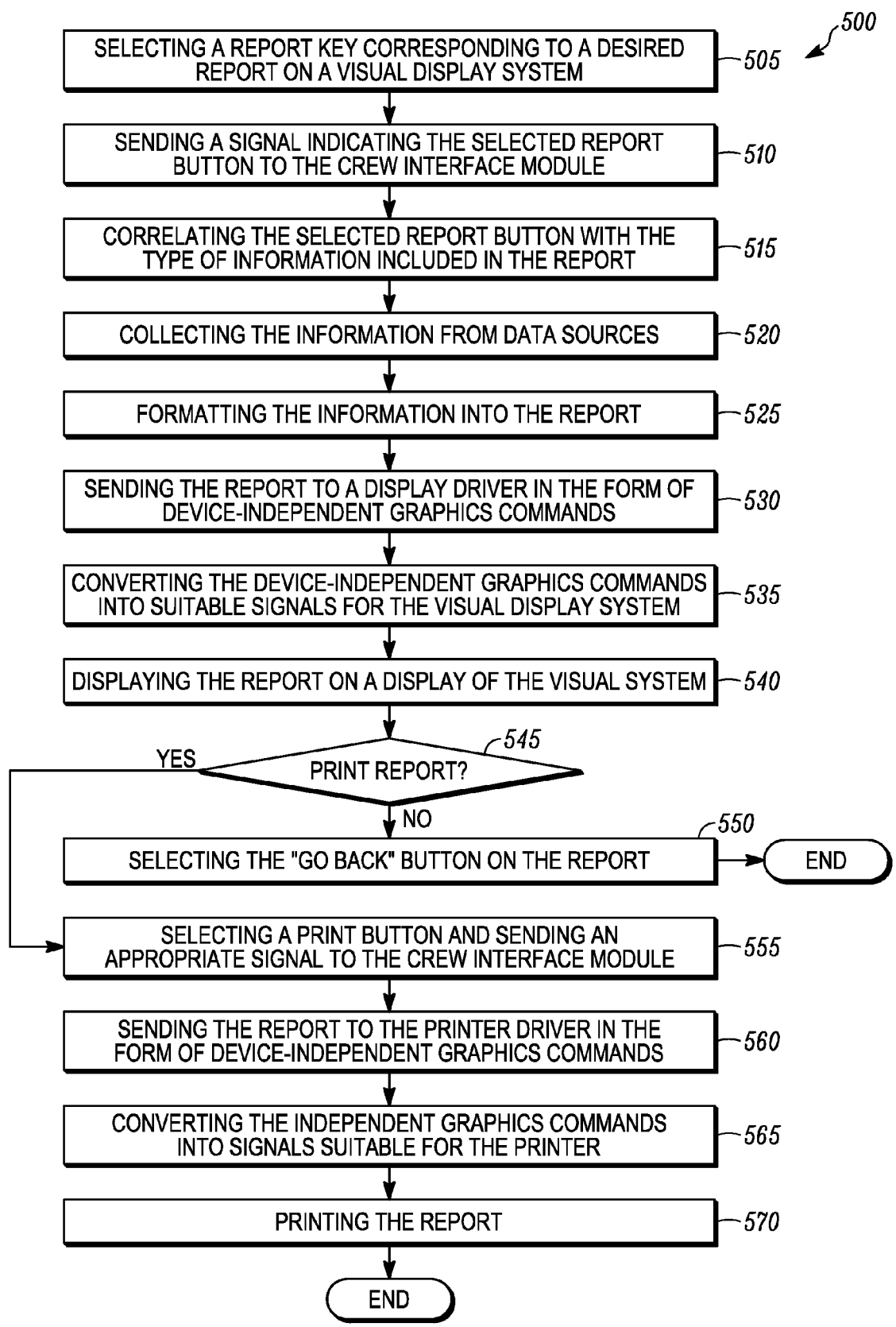
FIG. 3 is a flow chart illustrating a method of generating and viewing a report in accordance with an exemplary embodiment of the present invention.

Having described the aircraft system 100 structurally, and generally described its overall functionality, additional details about the aircraft system 100, as well as a method 500 for creating and displaying a report on the display 134 of the visual display system 104, will now be described. In doing so, reference should be made to FIG. 3, which depicts the method 500 in flowchart form, and additionally with reference to portions of the aircraft system 100 in FIGS. 1, 2 and 4 as needed. In accordance with an exemplary embodiment of the present invention, the aircraft system 100 can display a report on the visual display system 104. A report can be defined as a collection of information to display on the display 134 of the visual display system 104 and/or printed on the printer 105. Although not necessarily, the report is generally displayed on the display 134 of the visual display system 104 in a format corresponding to a printed version of the report. Moreover, the report can include information that is only otherwise viewable on more than one screen page of the visual display system 104.

In a first step 505, a user, such as pilot or other member of a flight crew, chooses one of the report keys 216 on the input interface 136 of the visual display system 104. As noted above, the report keys 216 form part of the input interface 136 of the visual display system 104. In one embodiment, the report keys 216 can be so-called "hotkeys" that can be defined by a customer of the aircraft system 100. In the illustrated embodiment, the report keys 216 include a first report key 218 labeled "RP1," a second report key 220 labeled "RP2," and a third report key 222 labeled "RP3." Although only three report key 216 are provided, additional or fewer report keys 216 can be provided. In an alternate embodiment, the report keys 216 can be replaced by an interactive display, for example, a list on the display 134.

The report keys 216 each correspond to a pre-defined report containing information from the data sources 117-121 that the user desires to view on the monitor. In an alternate embodiment, the user can define the type of information in the report with the visual display system 104. For example, as discussed in further detail below with reference to FIG. 4, the selected report key 216 can correspond to a flight plan report 400 that the user wants to view and/or print. Other types of reports can include received messages report; flight summary reports, terminal weather reports, and airport information reports. As noted above, the information in the report is not otherwise typically viewable on a single screen page of the visual display system 104 and/or in a format that corresponds to a printed version of the report.

In a step 510, the visual display system 104 sends a signal indicating the report key 216 selected by the user to the crew interface module 122 via the display driver 124. As discussed generally above, the crew interface module 122 is a module for generating a user interface displayed on the display 134 of the visual display system 104 and has a function for generating the elements of print setting screens.

In a step 515, the crew interface module 122 correlates the selected report key 216 with the type of information included in the report. Generally, the crew interface module 122 includes a data table that identifies the information in a selected report.

In a step 520, the crew interface module 122 collects the information from the data sources 117-121 that are included in the report. In a step 525, the crew interface module 122 includes the format module 128 that receives the information from the data sources 117-121 and formats the information into the report. The format module 128 can include graphical components based upon ARINC 661 that define the layout, colors, and fonts of the report, as well as the format of the information from the data sources 117-121. The format module 128 may also include applications such as Crystal Reports™ manufactured by Business Objects of San Jose, Calif. The format module 128 includes a scrolling graphical component 132 that enables a relatively large amount of tabular information to be displayed. Although only one scrolling graphical component 132 is illustrated, additional scrolling graphical components can be provided.

In a step 530, the crew interface module 122 sends the report to display driver 124. At this point, the report is sent to the display driver 124 in the form of device-independent graphics commands. In a step 535, the display driver 124 translates the device-independent graphics commands from crew interface module 122 into commands which the visual display system 104 can use to display the report on the display. The display driver 124 converts the tabular information from the scrolling graphical component 132 of the format module 128 into a scrollable portion that will fit into a more compact space, as will be described in further detail below in reference to the description of FIG. 4.

Once the display driver 124 has converted the device-independent graphics commands from the crew interface module 122 into signals suitable for the visual display system, the display driver 124 sends the report to be displayed on the display 134 of the visual display system 104 in a step 540. The report generally corresponds to the formatting and scaling of a report as it would be printed. However, as discussed in further detail below, the report 400 can be displayed with one or more scrolled portions. The displayed report can be a single screen, or the displayed report can be paginated and include header information on each page in a page break.

Figure 4:
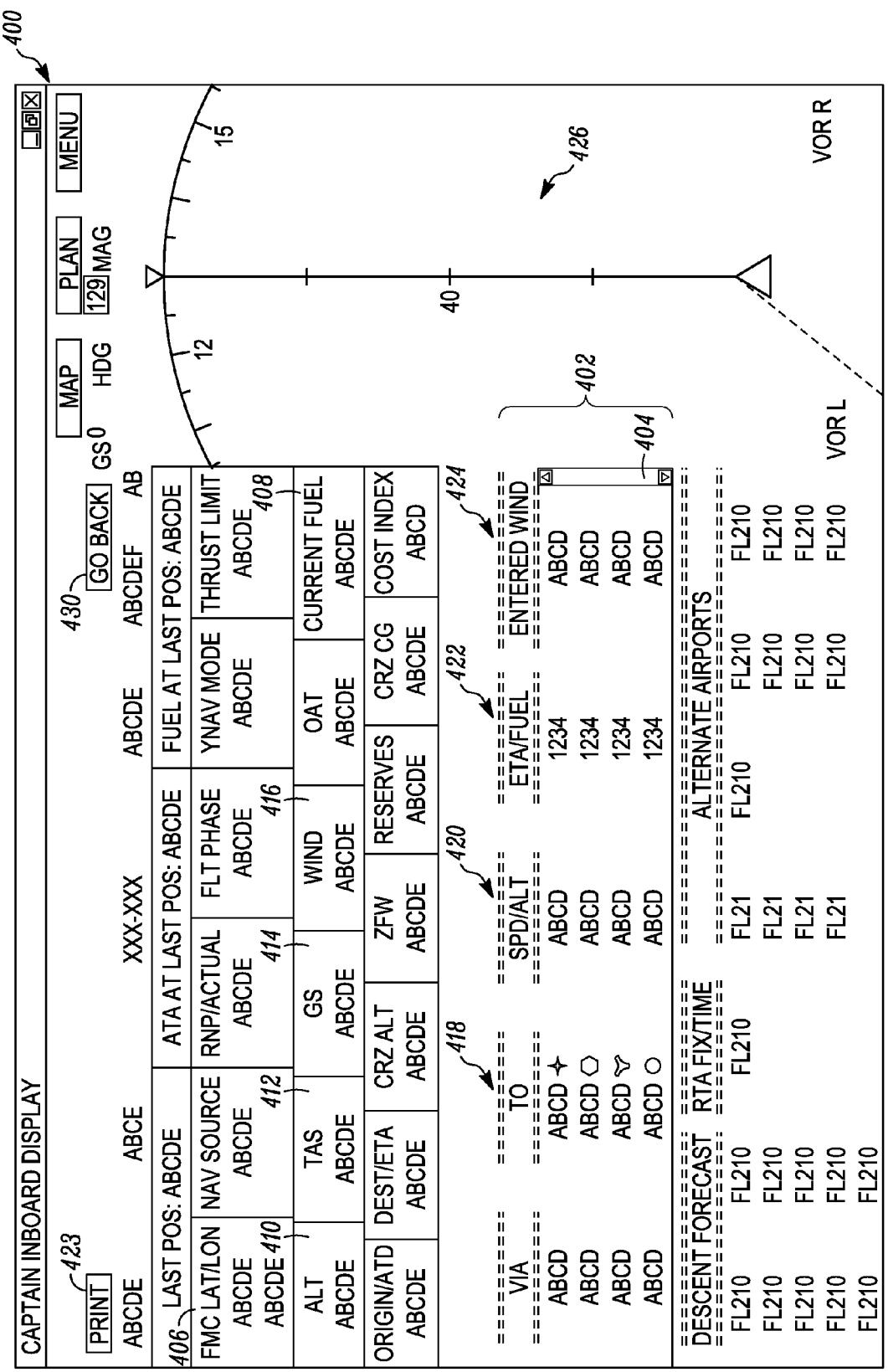
FIG. 4 is an exemplary report viewable on a display of the visual display system of FIG. 2.

FIG. 4 illustrates an exemplary report 400 displayed on the display 134 of the visual display system 104 and corresponding to the report key 116 selected by the user. The exemplary, illustrated report 400 is a flight plan report 400, and includes current information about the aircraft state, such as for example, latitude and longitude position 406, fuel 408, altitude 410, true airspeed 412, ground speed 414, and wind speed 416, as well as other, unlabeled information.

As noted above, one or more portions 402 of the report 400 can be scrolled, which would normally be printed as a full table. In the exemplary embodiment, the scrolled portion 402 includes flight plan information in the form of flight legs with planned speeds, altitudes, winds, and predicted time and fuel at the completion of each flight leg. To display the scrolled portion 402, the display driver 124 can provide display commands to the visual display system 104 for scrolling the information in the portion 402 of the report 400. Generally, scrolling can be used to show information that is larger than the viewpoint or allocated portion of the display 134. The viewable information within the scrolled portion 402 can be moved with the aid of arrow keys 404. Alternatively, scrolling can be preformed using a keyboard, such as with Page Up/Page Down keys, or with a scroll wheel on a mouse. The scrolled portion 402 in the report 400 can enable a pilot to quickly scroll the information in a single screen instead of waiting for a corresponding printed report that could contain many pages. The scrolling graphical component 132 may also provide a report in which the user may only scroll through certain rows or columns (i.e., a "freeze row" or "freeze column" function) while preventing the certain data from moving out of view. As an example, the top row of the scrolled portion 402 can be frozen while the bottom three rows can be scrolled.

In a step 545, the user determines whether to print the report 400, or return to the screen pages in the visual display system 104, e.g., the IDENT page illustrated in FIG. 2. In a step 450, if the user decides not to print the report 400, the user selects the "Go Back" key 430 on the report 400, as shown in FIG. 4, in a step 550. However, in a step 555, if the user decides to print the report 400, the user selects a print key 428, as also shown in FIG. 4, and the visual display system 104 sends an appropriate signal to the crew interface module 122 via the display driver 124. In a step 560, the crew interface module 122 then sends the report to the printer driver 126. For information to be printed on a printer 105, crew interface module 122 sends device-independent graphics commands to the printer driver 126. In a step 565, the printer driver 126 translates the device-independent graphics commands from crew interface module 122 into commands that the printer 105 can use to print the report in a step 570. In one embodiment, the information associated with the scrolled portion of the report displayed on the visual display system 104, such as the scrolled portion 402 in the report 400, is printed as a complete list or table. Otherwise, the printed report can be similar to the report displayed on the visual display system 104 as described above.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system, comprising:
a visual display system;
a printer; and
a flight management system coupled to the visual display system and the printer, the flight management system including a processor and a plurality of data sources coupled to the processor,
the processor comprising a crew interface module coupled to the plurality of data sources, a display driver coupled to the crew interface module and the visual display system, and a printer driver coupled to the crew interface module and the printer,
the crew interface module configured to generate a report from data from the data sources and to send the report to the visual display system via the display driver, the visual display system configured to receive the report and to display the report,
wherein the crew interface module includes a scrolling graphical component that converts a first portion of the data of the report into a scrollable list for display on the visual display system, wherein the visual display system is configured to display a first display portion and a second display portion on a single screen, the first display portion including the scrollable list and the second display portion being unscrollable, wherein the visual display system is configured to display the second display portion in a printable format, and wherein the printer, via the printer driver, is configured to print the second display portion in the printable format and the first display portion as an unscrolled list.

2. The aircraft system of claim 1, wherein the crew interface module is additionally configured to send the report to the printer via the printer driver.

3. The aircraft system of claim 1, wherein the crew interface module includes a format module for formatting the data from the data sources into the report.

4. The aircraft system of claim 1, wherein the crew interface is additionally configured to send the report to the printer via the printer driver, and wherein the printer is configured to print the first portion of the data in tabular form.

5. The aircraft system of claim 1, wherein the visual display system includes a display for displaying the report and an input interface configured to receive input from a user, the input interface including at least one report button for requesting the display of the report.

6. The aircraft system of claim 1, wherein the visual display system includes a first button displayed with the report and configured to request a screen page on the visual display system.

7. The aircraft system of claim 6, wherein the crew interface module is additionally configured to send the report to the printer via the printer driver, the visual display system including a second button displayed with the report and configured to have the report sent to the printer for printing.

8. The aircraft system of claim 1, wherein the visual display system is a graphical multi-functional display system.

9. The aircraft system of claim 1, wherein the visual display system is an ARINC 661 system or an OpenGL graphics system.

10. The aircraft system of claim 1, wherein the processor is configured to generate the report and to provide the report to the display driver in device-independent graphics command, and wherein the display driver is configured to convert the device-independent graphics commands into visual display commands.

11. The aircraft system of claim 1, wherein the crew interface module is configured to generate the report as a flight plan report.

12. The aircraft system of claim 1, wherein the crew interface module is configured to generate the report as at least one of a flight summary report, a terminal weather report, and an airport information report.

13. The aircraft system of claim 1, wherein the first portion of the data includes information larger than the first display portion that forms the scrollable list on the first display portion, the printer configured to print the unscrolled list of the first portion of data corresponding to the scrollable list.

14. A method for providing a report to a user in an aircraft, comprising the steps of:
selecting a report key on a visual display system;
collecting information in a crew interface module from a plurality of data sources;
formatting the information into a report represented by device-independent graphics commands;
providing the device-independent graphics commands representing the report to a display driver;
displaying the report on a display of the visual display system, including at least one portion of the report displayed as a scrollable list; and
printing the report on a printer, including providing the device-independent graphics commands to a printer driver.

15. The method of claim 14, wherein the displaying step including displaying a key selectable by the user for printing the report.

16. The method of claim 14, wherein the formatting step includes formatting the information with a format module.

17. The method of claim 14, wherein the printing step includes printing the report in tabular form.

18. The method of claim 14, wherein the selecting step includes selecting the report key on the visual display system as a graphically multi-functional display system.

19. The method of claim 14, wherein the selecting step includes selecting the report key on the visual display system as an ARINC 661 system.

20. An aircraft system, comprising:
a visual display system;
a printer; and
a flight management system coupled to the visual display system and the printer, the flight management system including a processor and a plurality of data sources coupled to the processor, the processor comprising a crew interface module coupled to the plurality of data sources, a display driver coupled to the crew interface module and the visual display system, and a printer driver coupled to the crew interface module and the printer,
wherein the crew interface module is configured to generate a report from data from the data sources, and send the report to the visual display system via the display driver and to the printer via the printer driver, the crew interface module including a format module for formatting the data from the data sources into the report, the format module including a scrolling graphical component configured to convert a first portion of the data of the report into a scrollable list for display on the visual display system and a second portion of the data of the report into an unscrollable area on the visual display system with the scrollable list, wherein the visual display system is configured to display the second display portion in a printable format, and wherein the printer, via the printer driver, is configured to print the second display portion in the printable format and the first display portion as an unscrolled list.

* * * * *